Dec. 19, 1961    H. D. HODGES    3,013,521
DRIVERS BUMPER MOUNTED SIGHTING GUIDE
Original Filed Aug. 17, 1956

INVENTOR.
HARRY D. HODGES

United States Patent Office 3,013,521
Patented Dec. 19, 1961

3,013,521
DRIVERS BUMPER MOUNTED SIGHTING GUIDE
Harry D. Hodges, Lake Preston, S. Dak.
Continuation of abandoned application Ser. No. 604,675, Aug. 17, 1956. This application Feb. 16, 1959, Ser. No. 793,339
3 Claims. (Cl. 116—28)

This invention relates to automobiles and particularly it is an object to provide a sighting guide projecting outwardly from the side of the automobile in a position such that the driver looking out of his window can see the end of the guide and judge its distance from a curb or other obstacle to better know his position with respect thereto.

Driving is particularly difficult for the aged and the physically handicapped and this is particularly true if they are relatively short as makes leaning out of a window from the driver's seat difficult and for some impossible. The problem of spacing a car from a curb is an annoyance to any driver, particularly when their nerves are on edge, so to speak, from the strain of driving.

It is therefore an object to provide a sighting guide projecting outwardly from the side of a car a sufficient and substantial distance so as to be practical for serving the purpose of providing a point across which a driver can sight from a driving position and without leaning out of the window.

I am aware that wires and other devices have been extended from fenders for the purpose of determining by sound the spacing of fenders from curbs, however, these have soon been accidentally displaced and usually extend downwardly from the fender so that their outer ends are down too low to be seen from the normal driving position, even for taller drivers.

A further object is, therefore, to provide a guide which extends outwardly from the bumper position where it is higher and more easily seen and particularly from the end of a wrap-around type of bumper now common on all known cars.

A sighting guide must extend outwardly from the side of a car a distance such that if it is not very collapsible, it would bend fenders of adjacent cars in crowded parking areas. For this reason, I feel there is an important feature in my new concept of having the sighting guide provided with vertical accordion like folds on its rearward side to enhance the collapsibility as is particularly important inasmuch as a guide must be of a material of substantial weight and strength in order to hold such a horizontal position without drooping of its own weight and, therefore, being of such strong material without collapsibility, it could do substantial harm by denting fenders and doors of adjacent cars.

With these and other objects and advantages in view the invention embodies a body having an arcuate leading face with a corrugated trailing face in which the corrugations are positioned in a single vertical plane, the body having an inner end surface positioned in a single vertical plane normal to the plane in which the corrugations are positioned and in which upper and lower surfaces of the body converge between parallel horizontal planes substantially to a point at the outer end of the body, and in which a threaded stud with a nut and washer thereon extends from the inner end surface of the body.

A further object of this invention is to provide a bumper mounted device adapted to project outwardly from the bumper of an automobile thereby giving the automobile an appearance of being substantially wider than the solid metal parts of the automobile actually are. However, my device is actually not solid, but is collapsible whereby if it should be bumped by an oncoming car, then no damage of any substantial nature would occur.

I have discovered the concept of causing an oncoming driver to feel that a car is actually wider than it really is, thereby causing the oncoming driver to give the car adequate room is, in the end, a kind consideration both to the driver having my device and to the driver of an oncoming car. It is my opinion that this device can avoid many collisions, especially when meeting other cars or long semi-trailer trucks on a curve where it is often a careless habit of drivers not to stay in their own lane thereby forcing other drivers to drive with one side of their car off of the hard surface on dangerous, uneven ground.

A particular object is to provide a device that can have its ideal effect when two cars are approaching each other in different lanes with both cars using the devices of my invention, whereby both drivers tend to remain those few inches farther from the other car that are so necessary to avoid a side-swiping collision, so common in heavy traffic.

A particular objective is to provide a device which will prevent collisions in this fashion especially on automobiles that are being made wider and wider with each new car styling whereas so many of the nation's roads are still of the same size.

This application is a continuation of my co-pending application filed August 17, 1956, Serial No. 604,675, now abandoned.

Other features and advantages of the invention will appear from the following description taken in connection with the drawings, wherein.

Figure 1:
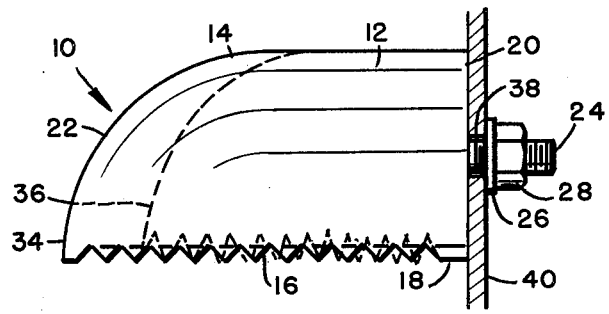
FIGURE 1 is a plan view of the improved bumper driving guide.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a body of resilient material having an arcuate leading surface 14, corrugations, or accordion like vertical folds, 16 in a rear face 18, an end surface 20, and an arcuate outer end 22, and the body is provided with a threaded stud 24 that extends from the end surface 20 and that is provided with a washer 26 and a nut 28.

The accordion like vertical folds 16 are positioned in a single vertical plane, and the end surface 20 is normal to the plane through the corrugations.

The body is provided with parallel upper and lower surfaces which extend from the end surface 20 to points 30 and 32 from which the upper and lower surfaces converge to a tip 34 at the outer or extended end of the body. The end surface provides a base and the front surface, which is curved in a vertical section, curves from the forward edge to the vertical plane through the corrugations at the outer end of the body providing a wing-shaped finger or feeler, which, upon engagement of the outer end thereof with a passing surface provides a rubbing sound thereby producing a warning advising the operator of a vehicle upon which the driving guide is positioned that the vehicle he is driving is dangerously close to a vehicle he is passing. The vertically positioned corrugations provide an accordion fold adding flexibility and permitting the outer end of the guide to collapse to the position indicated by the dotted lines 36.

*Operation*

Figure 2:
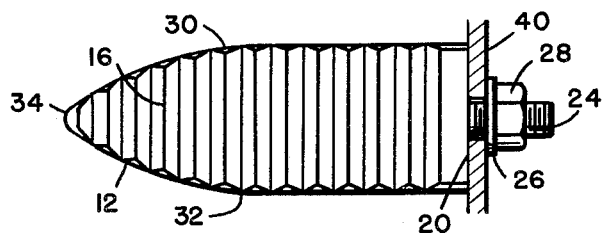
FIGURE 2 is a rear elevational view of the guide showing the guide installed on the end of a bumper of a motor vehicle, the bumper being shown in section.
Figure 3:
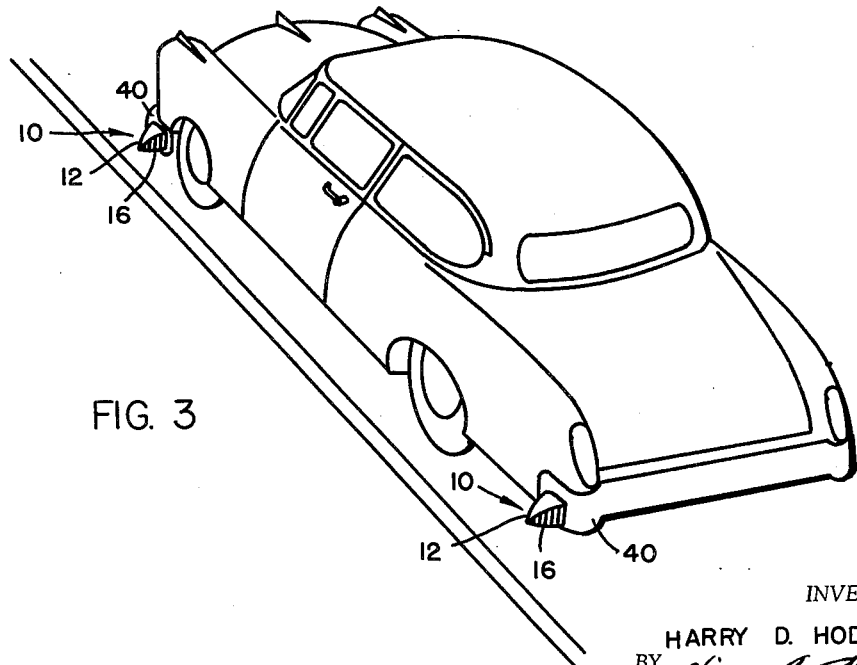
FIGURE 3 is a perspective view showing the improved guide positioned on the ends of bumpers of a motor vehicle.

With the parts assembled as illustrated and described the stud 24 is inserted through an opening 38 in the end of a bumper 40 and the guide is clamped to the end of the bumper by the nut and washer, as shown in FIGURES 1 and 2.

The bumper driving guides contact the surface of a vehicle being passed by a vehicle upon which the guides are positioned providing a rubbing sound with the result that the operator of the vehicle is warned that the vehicle he is driving is too close to the vehicle he is passing.

From the foregoing specification it will become apparent that the invention disclosed will adequately accomplish the functions for which it has been designed and in economical manner, and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecsssary.

Changes in shape, size, and arrangement of details and parts such as come within the purview of the invention claimed may be resorted to in actual practice if desired.

Having now described the invention that which is claimed to be new and desired to be procured by Letters Patent, is:

1. In a driving guide, the combination which comprises an elongated finger of resilient material, the finger being wing-shaped in plan and having a front surface that is curved in a vertical section, and a rear surface that is corrugated in a single vertical plane, one end of the finger being in a vertical plane providing a base and the vertical plane of the base being normal to the single vertical plane that extends through the corrugations, the end of the finger opposite to the end forming the base curving from the front to the plane through the corrugations providing an arcuate rubbing surface to contact a passing vehicle, the upper and lower surfaces of the finger converging from the base to a point at the extended end, and a threaded stud having a nut and a washer thereon extended from the base of the finger.

2. In combination, an automobile having a bumper with a transverse center portion, an end portion disposed at approximately a right angle to said center portion, and a bumper-mounted tubular sighting guide wing-shaped in plan having a arcuate-shaped sighting end and being elongated to extend in a direction laterally of the side of said automobile and positioned on said end portion to extend outwardly of the side of said automobile from said end portion a distance substantial enough for effective assistance to the driver in ascertaining his position with respect to an obstacle by sighting on the sighting end of the guide, said bumper sighting guide being formed of a resilient material and adapted to partially collapse upon contact with an obstruction, said guide having a side provided with a surface partially disposed longitudinally of said automobile and positioned against said end portion of said bumper.

3. The sighting guide and automobile combination of claim 2 in which said sighting guide is provided with accordion-like vertical folds on its rearward side to facilitate said collapsing so that the sighting guide can be made of material of substantial strength so as to hold its elongated shape without collapsing under normal conditions and yet collapse sufficiently when struck to substantially prevent its breakage.

References Cited in the file of this patent
UNITED STATES PATENTS

| | | |
|---|---|---|
| 2,141,844 | Reznor | Dec. 27, 1938 |
| 2,183,438 | Zaiger | Dec. 12, 1939 |
| 2,731,289 | Corydon | Jan. 17, 1956 |

FOREIGN PATENTS

| | | |
|---|---|---|
| 315,986 | Great Britain | July 25, 1929 |